(12) United States Patent
Hsu

(10) Patent No.: US 8,243,825 B2
(45) Date of Patent: Aug. 14, 2012

(54) DECODING AND ENCODING METHOD FOR DEINTERLEAVER

(75) Inventor: Chien-Te Hsu, Taipei County (TW)

(73) Assignee: Princeton Technology Corporation, Taipei County (TW)

( * ) Notice: Subject to any disclaimer, the term of this patent is extended or adjusted under 35 U.S.C. 154(b) by 1317 days.

(21) Appl. No.: 11/802,700

(22) Filed: May 24, 2007

(65) Prior Publication Data

US 2008/0253745 A1 Oct. 16, 2008

(30) Foreign Application Priority Data

Apr. 10, 2007 (TW) .................. 96112463 A

(51) Int. Cl.
*H04N 7/12* (2006.01)

(52) U.S. Cl. ............... 375/240.27; 348/607; 714/761

(58) Field of Classification Search ............. 375/240.26, 375/240.27, 240.28, 240.29
See application file for complete search history.

(56) References Cited

U.S. PATENT DOCUMENTS

2005/0207488 A1* 9/2005 Ouyang et al. ............ 375/240.2

FOREIGN PATENT DOCUMENTS

CN 1383618 12/2002
* cited by examiner

*Primary Examiner* — Gilberto Barron, Jr.
*Assistant Examiner* — Malcolm Cribbs
(74) *Attorney, Agent, or Firm* — Muncy, Geissler, Olds & Lowe, PLLC

(57) ABSTRACT

A decoding method implemented in a deinterleaver is provided, converting a television signal to image data. A preset mechanism is provided for converting the television signal to the image data. The preset mechanism comprises a plurality of multiplication and addition operations performed using a database and an adder.

16 Claims, 3 Drawing Sheets

DECODING AND ENCODING METHOD FOR DEINTERLEAVER

BACKGROUND

The invention relates to a coding/decoding method for a deinterleaver, and in particular to a coding/decoding method for a deinterleaver which converts a television signal to image data.

This section is intended to introduce the reader to various aspects of the art, which may be related to various aspects of the invention, which are described and/or claimed below. This discussion is believed to be helpful in providing the reader with background information to facilitate a better understanding of the various aspects of the invention. Accordingly, it should be understood that these statements are to be read in this light, and not as admissions of related art.

Generally, during transmission for digital television, image data to be transmitted is encoded, and the encoded image data is transmitted through wireless signals. After the wireless signals are received by the digital television, the encoded data is then decoded, and converted to image data, which is then displayed on the television screen.

Referring to FIG. 1(a), image data for a digital television is displayed. As shown in FIG. 1(a), image data 1 comprises a system part 11 and a data part 12. When the image data 1 is transmitted via wireless directly, interference during the wireless transmission process may cause abnormal peaks in the image data 1. The abnormal peak causes damage to signals of a portion of continuing system part 1 or data part 12. It is difficult to recover the damaged signals after which are received by a digital television. When the image data is displayed, the damaged part of the image cannot be displayed correctly. If the system part of the image data is damaged, the image data cannot not be displayed. Accordingly, when image data is transmitted, the image data is encoded, i.e., arranged in a non-contiguous way. Referring to FIG. 1(b), encoded image data 2 comprises system part 21 and data part 22, wherein the system part 21 is divided into several segments, each arranged in different position, followed by discontinuous data part 22. If interference occurs during the transmission of image data 2, since data of image data 2 is arranged in a non-contiguous way, data damaged by the interference is not contiguous, accordingly. It is easier to recover the damaged data after received. Accordingly, image data is encoded before it is transmitted.

Formulae are utilized in encoding/decoding process of image data. In the encoding process, segments of the image data are arranged in different positions according to a formula. In the decoding process, the image data is recovered from the discontinuous rearranged segments according to a formula. Two conventional methods are used for calculation of the formulae. According to one conventional method, a look-up table in a database stores calculation results in advance, for retrieval when required. One disadvantage of this conventional method is that considerable storage capacity is required to store the data. According another conventional method, computing hardware is utilized, using adder and multiplier hardware to perform calculations to obtain a calculation result. One disadvantage of this method is that considerable calculation is required, consuming computing time, hardware resources, and cost.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An encoding method is provided for converting image data to a television signal. A preset mechanism is provided for converting the image data to the television signal. The preset mechanism comprises a plurality of multiplication and addition operations performed using a database and an adder.

A decoding method implemented in a deinterleaver is provided, converting a television signal to image data. A preset mechanism is provided for converting the television signal to the image data. The preset mechanism comprises a plurality of multiplication and addition operations performed using a database and an adder.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve developer specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1A:
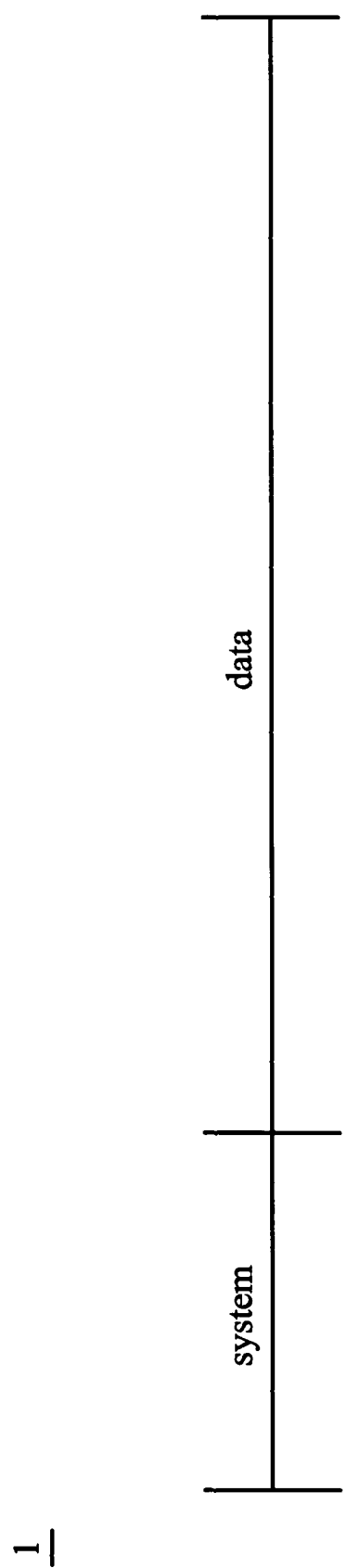
FIG. 1(a) shows image data for a digital television.
Figure 1B:
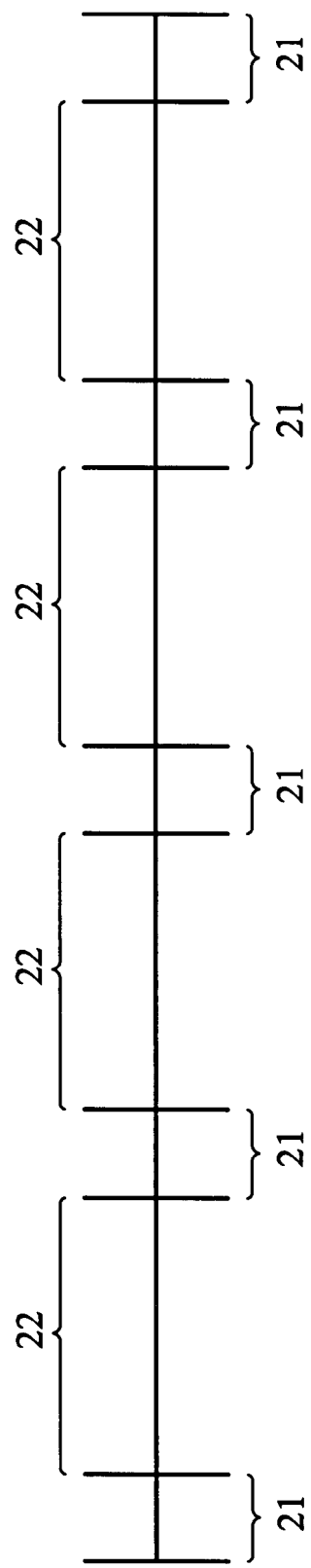
FIG. 1(b) shows encoded image data for a digital television.
Figure 2:
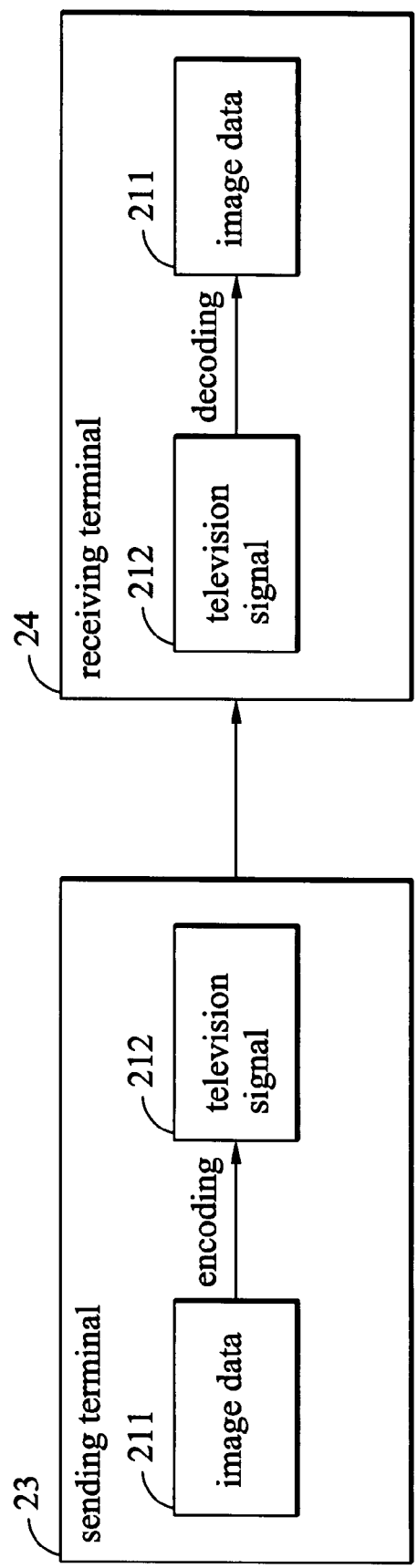
FIG. 2 is a schematic view of an embodiment of a transmission process of image data.

FIG. 2 is a schematic view of an embodiment of a transmission process of image data. As shown in FIG. 2, image data 211 is encoded to generate a television signal 212 by transmission terminal 23. The television signal 212 is then transmitted to receiving terminal 24. The television signal 212 is received by receiving terminal 24, transferred to deinterleaver 221, and decoded therein to generate image data 211 which can be displayed.

The image data 211 comprises a system part and a data part, wherein the system part comprises 36 bits of data, specified by TP0~TP35; the data part comprises 3744 bits of data, specified by Data0~Data3743. The image data 211 comprises 3780 bits of data, specified as X[3740].

The image data 211 is converted to an intermediate value Z[3780] before image data 211 is converted to television signal 212. The intermediate value Z[3780] is then converted to television signal 212. The television signal 212 also comprises 3780 bits of data, specified as Y[3780].

The system parts and data parts within image data 211 are arranged in sequence. That is, system parts TP0~TP35 are positioned first, followed by data parts Data0~Data3743.

When data X[3780] of image data 211 is converted to the intermediate value Z[3780], the system parts TP0~TP35 are rearranged as:

$$TP[0:35]=(0,140,279,419,420,460,699,839,840,980,\\1119,1259,1260,1400,1539,1620,1679,1680,\\1959,2099,2100,2240,2379,2519,2520,2660,\\2799,2939,2940,3080,3219,3359,3360,3500,\\3639,3779).$$

In other words, the 36 bits data of the system parts are positioned in the above locations, and data parts Data0~Data3743 are interleaved therebetween. Accordingly, the intermediate value Z[3780] are rearranged as $$Z[3780]=(TP[0],Data[0],Data[1]\ldots Data[138],TP\\ [1],Data[139]\ldots Data[3743],TP[35]).$$

The intermediate value Z[3780] is further converted to arranged data Y[3780] of television signal 212, wherein the Z[3780] is converted to Y[3780] according to:

$$Y[p*540+n*108+m*54+q*27+k*9+j*3+i]=Z[i*1260+\\j*420+k*140+q*70+m*35+n*7+p],$$

wherein (i=0, i<3, i=i+1); (j=0, j<3, j=j+1); (k=0, k<3, k=k+1); (q=0, q<2, q=q+1); (m=0, m<2, m=m+1); (n=0, n<5, n=n+1); (p=0, p<7, p=p+1).

Using the formula, the intermediate value Z[3780] can be converted to data sequence Y[3780] of television signal 212, thereby continuous data is further scattered, making it easier to recover the television signal 212 if it suffers from interference during transmission.

According to the formula, considerable addition and multiplication operations are required. 3780 sets of data stored in a database to record results of the operations occupy considerable memory. If a result of the formula is calculated by a multiplier and an adder, multiplication operations are performed 6 times and addition operations 5 times. Accordingly, the load on the hardware is heavy. According to the embodiment, look-up table in database is implemented, as well as an adder.

According to the formula, 7 variables are involved: i, j, k, q, m, n, and p, wherein the i, j, and k can be 0, 1, or 2, respectively, q and m can be 0 or 1, n can be 0~4, p can be 0~6. In other words, there are 3*3*3*2*2*5*7=3780 different kinds of the permutation and combination of the 7 variables. Accordingly, 3780 sets of data are to be stored in a database to keep a record of the results of the operations. To reduce memory requirement for storing results of calculation of the formula, the 7 variables can be divided into 2 groups, and results thereof are stored in the database, and an addition operation thereof is then implemented by an adder.

For example, the original formula for calculating Y[3780] is Y[p*540+n*108+m*54+q*27+k*9+j*3+i], wherein the calculation results of (p*540+q*27+j*3) and (m*54+k*9+n*108+i) are calculated and stored in database in advance, because p variable corresponds to 7 possible values, q variable corresponds to 2 possible values, j variable corresponds to 3 possible values, there are 7*2*3=42 sets of calculation results for the (p*540+q*27+j*3) calculation. Similarly, there are 2*3*3*5=90 sets of calculation results for the (m*54+k*9+n*108+i) calculation. Accordingly, there are 42+90=132 sets of calculation results stored in the database. Compared to 3780 sets of calculation results, memory requirement for 132 sets of calculation results is reduced by at least 95%. The addition operation for adding the calculation results of (p*540+q*27+j*3) and (m*54+k*9+n*108+i) is performed by an adder. Accordingly, the memory requirement can be reduced at least 95% by performing the addition operation 1 time.

The division among the 7 variables is not limited to the described division method. Each of the 7 variables can be assigned to either group to reduce corresponding memory requirement. When calculation is performed by an adder, an addition operation of data with the same number of bits is easier than an addition operation of data with different number of bits. Accordingly, data in the described groups of variables may have similar number of bits, and loads for the adder can be reduced accordingly.

According to the embodiment, a look-up table in a database and an adder are implemented in converting image data to television signals. The same formula is utilized in converting the television signals to the image data. In addition, similar implementation of database and adder is used in converting the television signals to the image data. Accordingly, details in converting the television signals to the image data are not described here.

Although in the embodiment the database comprises a look-up table, it is to be understood that the invention is not limited thereto.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An encoding method for converting image data to a television signal, comprising:

using a database and an adder to convert the image data to the television signal according to a preset mechanism;

wherein the preset mechanism converts the image data to the television signal according to a preset formula comprising a plurality of variables, and uses the variables and the image data to perform a plurality of multiplication operations and a plurality of first addition operations;

wherein the plurality of variables are assigned and divided into two groups, and results of the two groups are stored in the database, and then a second addition operation to the two groups is implemented by the adder.

2. The method of claim 1, wherein the database comprises a mapping table, wherein the method uses a look-up process to provide a result of the plurality of multiplication operations and the first addition operations.

3. The method of claim 2, wherein the television signal is provided through the second addition operation to the result of the plurality of multiplication operations and the first addition operations.

4. The method of claim 3, further comprising, when encoding one of the image data, using the adder to perform the second addition operation once.

5. The method of claim 3, wherein a difference of bit number between an addend and an augend during the addition operation is a possible minimum.

6. The method of claim 1, wherein the preset mechanism is a formula:

$$Y[p*540+n*108+m*54+q*27+k*9+j*3+i]=Z[i*1260+\\j*420+k*140+q*70+m*35+n*7+p],$$

wherein Y specifies data arrangement of the television signal, Z specifies data arrangement of the image data being scattered, i, j, k, q, m, n, p are the variables.

7. The method of claim 1 is implemented in a deinterleaver of a digital television.

8. The method of claim 1, wherein the image data comprises a system part and a data part.

9. A decoding method for converting a television signal to image data, comprising:

using a database and an adder to convert the television signal to the image data according to a preset mechanism;

wherein the preset mechanism converts the image data to the television signal according to a preset formula with a plurality of variables, and uses the variables and the image data to perform a plurality of multiplication operations and first addition operations;

wherein the plurality of variables are assigned and divided into two groups, and results of the two groups are stored in the database, and then a second addition operation to two groups is implemented by the adder.

10. The method of claim 9 wherein the database comprises a mapping table, wherein the method uses a look-up process to provide a result of the plurality of multiplication operations and the first addition operations.

11. The method of claim 10, wherein the television signal is provided through the second addition operation to further using the result of the plurality of multiplication operations and the first addition operations.

12. The method of claim 11, further comprising, when decoding one of the television signal, using the adder to perform the second addition operation once.

13. The method of claim 11, wherein a difference of bit number between an addend and an augend during the second addition operation is a possible minimum.

14. The method of claim 9, wherein the preset mechanism is a formula:

$$Y[p*540+n*108+m*54+q*27+k*9+j*3+i]=Z[i*1260+j*420+k*140+q*70+m*35+n*7+p],$$

wherein Y specifies data arrangement of the television signal, Z specifies data arrangement of the image data being scattered, and i, j, k, q, m, n, p are the variables.

15. The method of claim 9, implemented in a deinterleaver of a digital television.

16. The method of claim 9, wherein the television signal comprises a system part and a data part.

* * * * *